United States Patent
Kim

(10) Patent No.: US 9,892,872 B2
(45) Date of Patent: Feb. 13, 2018

(54) DISCONNECTING SWITCH AND EARTHING SWITCH FOR GAS INSULATED SWITCHGEAR

(71) Applicant: Hyundai Heavy Industries Co., Ltd., Ulsan (KR)

(72) Inventor: Dong-Min Kim, Ulsan (KR)

(73) Assignee: Hyundai Electric & Energy Systems Co., Ltd., Seoul (KR)

( * ) Notice: Subject to any disclaimer, the term of this patent is extended or adjusted under 35 U.S.C. 154(b) by 0 days.

(21) Appl. No.: 15/323,164

(22) PCT Filed: Jun. 12, 2015

(86) PCT No.: PCT/KR2015/005942
§ 371 (c)(1),
(2) Date: Dec. 30, 2016

(87) PCT Pub. No.: WO2016/003085
PCT Pub. Date: Jan. 7, 2016

(65) Prior Publication Data
US 2017/0236657 A1     Aug. 17, 2017

(30) Foreign Application Priority Data

Jul. 1, 2014 (KR) .................. 10-2014-0081960

(51) Int. Cl.
*H01H 31/00* (2006.01)
*H01H 33/42* (2006.01)
(Continued)

(52) U.S. Cl.
CPC ............ *H01H 3/04* (2013.01); *H01H 31/003* (2013.01); *H01H 33/6661* (2013.01); *H02B 5/06* (2013.01)

(58) Field of Classification Search
CPC .. H01H 31/003; H01H 31/32; H01H 33/6661; H01H 33/42; H01H 3/04;
(Continued)

(56) References Cited

U.S. PATENT DOCUMENTS 5,644,117 A    7/1997   Bolongeat-Mobleu et al.
6,680,453 B2   1/2004   Rokunohe et al.
(Continued)

FOREIGN PATENT DOCUMENTS

DE    102009030608 A1   12/2010
EP       0680063 A1     11/1995
(Continued)

OTHER PUBLICATIONS

International Search Report issued in PCT/KR2015/005943 dated Aug. 28, 2015.
(Continued)

*Primary Examiner* — Adam B Dravininkas
(74) *Attorney, Agent, or Firm* — Mintz Levin Cohn Ferris Glovsky and Popeo, P.C.; Peter F. Corless

(57) ABSTRACT

Disclosed are a disconnecting switch and an earthing switch for a gas insulated switchgear capable of implementing three positions by a single operator and may have a stable interpolarity contact.

According to the present invention, the size of a gas-insulated switchgear may be reduced by operating a disconnecting switch and an earthing switch by a single operator, and implementing three positions.

11 Claims, 8 Drawing Sheets

(51) Int. Cl.
*H02B 5/06* (2006.01)
*H01H 3/04* (2006.01)
*H01H 33/666* (2006.01)

(58) Field of Classification Search
CPC .. H02B 13/035; H02B 11/28; H02B 13/0354; H02B 13/075; H02B 5/06
See application file for complete search history.

(56) References Cited

U.S. PATENT DOCUMENTS

| | | | |
|---|---|---|---|
| 8,487,203 B2 | 7/2013 | Shin et al. | |
| 2007/0068903 A1* | 3/2007 | Hashimoto | H01H 33/40 218/57 |
| 2012/0012449 A1* | 1/2012 | Shin | H01H 3/46 200/5 B |
| 2012/0103767 A1* | 5/2012 | Goschel | H01H 31/003 200/17 R |
| 2013/0341171 A1* | 12/2013 | Espeseth | H01H 33/24 200/502 |
| 2014/0097069 A1 | 4/2014 | Endre et al. | |
| 2014/0116859 A1* | 5/2014 | Lee | H01H 31/003 200/18 |

FOREIGN PATENT DOCUMENTS

| | | |
|---|---|---|
| EP | 1 385 243 A2 | 1/2004 |
| JP | H08-249987 A | 9/1996 |
| JP | H11-317135 A | 11/1999 |
| JP | 2002-315120 A | 10/2002 |
| JP | 2004-063110 A | 2/2004 |
| JP | 2009-301922 A | 12/2009 |
| JP | 2012-022942 A | 2/2012 |
| KR | 2005-0098360 A | 10/2005 |
| KR | 10-1232985 B1 | 2/2013 |
| KR | 2014-0003782 U | 6/2014 |
| WO | 2012/171569 A1 | 12/2012 |

OTHER PUBLICATIONS

Extended European Search Report for European Patent Application No. 15814741, dated Jul. 10, 2017, 6 pages.

* cited by examiner

DISCONNECTING SWITCH AND EARTHING SWITCH FOR GAS INSULATED SWITCHGEAR

CROSS-REFERENCE TO RELATED APPLICATIONS

This application is a National Phase application filed under 35 U.S.C. § 371 of PCT International Application No. PCT/KR2015/005942 with an International Filing Date of Jun. 12, 2015, which claims under 35 U.S.C. § 119(a) the benefit of Korean Application No. 10-2014-0081960, filed Jul. 1, 2014, the entire contents of which are incorporated herein by reference.

TECHNICAL FIELD

The present disclosure relates to a disconnecting switch and an earthing switch for a gas-insulated switchgear, and more specifically, to a disconnecting switch and an earthing switch for a gas-insulated switchgear allowing three positions to be implemented by a single operator.

BACKGROUND ART

In general, gas-insulated switchgears are provided with devices such as a circuit breaker (CB) for opening and closing a load in transmission and substation systems or electrical circuits or blocking current when an accident due to earthing or a short circuit occurs, earthing switches (ES) for removing residual voltage and current within gas-insulated switchgears in order to maintain the gas-insulated switchgears, and disconnecting switches (DS) having the capability to open and close a current exiting in a no-load transformer and a charging current or a loop current of a line or a busbar while ensuring safety by separating electrostatic parts of devices from power sources when the devices are repaired.

In such gas-insulated switchgears, DS and ES perform opposite operations to each other in order to maintain systems. For example, when DS are closed, ES are opened, and when ES are closed, DS are opened.

In addition, DS and ES implement three positions in which systems are closed, disconnected, and grounded.

However, because DS and ES of the related art have a DS-side operator opening and closing the DS and an ES-side operator opening and closing the ES, respectively, the structure of gas-insulated switchgears may be relatively complex, and a large number of parts may be required in gas-insulated switchgears, thereby increasing the size thereof.

Furthermore, gas-insulated switchgears of the related art have a structure in which DS and a mover of ES are configured as a single lever type mover to allow the single mover to be rotated using a single operator, thereby implementing three positions.

However, because gas-insulated switchgears using such rotary lever-type movers has a structure in which lateral surfaces of the movers simply contact fixed conductors, contacts may be unstable.

DISCLOSURE

Technical Problem

An aspect of the present disclosure may provide a disconnecting switch and an earthing switch for a gas-insulated switchgear that may allow three positions to be implemented by a single operator and may have a stable interpolarity contact.

Technical Solution

According to an aspect of the present disclosure, a disconnecting switch and an earthing switch for a gas-insulated switchgear may include: a first fixed conductor; a second fixed conductor disposed to be spaced apart from the first fixed conductor; a mover unit fixed conductor disposed to face the first fixed conductor and the second fixed conductor; a rotatable conductor provided in the mover unit fixed conductor, and rotatable in directions of the first fixed conductor and the second fixed conductor in a state in which the rotatable conductor is electrically connected to the mover unit fixed conductor; a mover coupled to the rotatable conductor, and slidable in a lengthwise direction in a state in which the mover is electrically connected to the rotatable conductor; and an operation lever having one end rotatably coupled to a device body and the other end rotatably connected to the mover, and rotating to selectively connect the mover to the first fixed conductor or the second fixed conductor.

The rotatable conductor may be provided in a location at which an extension line of the first fixed conductor and an extension line of the second fixed conductor intersect at right angles.

The rotatable conductor and the mover unit fixed conductor may have a first contact member provided on a contact portion between the rotatable conductor and the mover unit fixed conductor, and supporting the rotatable conductor to allow the rotatable conductor to be rotated on the mover unit fixed conductor and electrically connecting the rotatable conductor to the mover unit fixed conductor.

The mover and the rotatable conductor may have a second contact member provided on a contact portion between the mover and the rotatable conductor, the second contact member supporting the mover to allow the mover to be slid on the rotatable conductor, and electrically connecting the mover to the rotatable conductor.

The disconnecting switch and an earthing switch for a gas-insulated switchgear may further include contacts configured to allow a front end portion of the mover to be inserted into and connected to the contacts, in which the contacts may be provided in the first fixed conductor and the second fixed conductor, respectively.

The disconnecting switch and an earthing switch for a gas-insulated switchgear may further include a contact configured to allow front end portions of the first fixed conductor and the second fixed conductor to be inserted into and connected to the contact, in which the contact is provided in the mover.

The disconnecting switch and an earthing switch for a gas-insulated switchgear may further include a shield provided to surround an outer peripheral surface of the front end portion of the first fixed conductor to reduce an electrical field generated in the first fixed conductor.

The shield may be configured to have an inner diameter of a front end portion thereof wider than an outer diameter of the front end portion of the first fixed conductor and narrower than an outer diameter of the contact.

The shield may move backwards to a rear of the first fixed conductor by external force, and may be supported by the first fixed conductor by the medium of an elastic member in order to return to the original position when the external force is removed.

The mover unit fixed conductor may have an internal space that may receive a portion of the mover protruding from the rotatable conductor.

The first fixed conductor may be connected to a transmission line, and the second fixed conductor may be connected to a grounding member.

Advantageous Effects

As set forth above, according to embodiments, the size of a gas-insulated switchgear may be reduced by operating a disconnecting switch and an earthing switch by a single operator, and implementing three positions.

Furthermore, the capability of alleviate an electrical field of a conductor may be improved using a shield configured to surround an end of the conductor without having a protruding edge portion.

DESCRIPTION OF DRAWINGS

The above and other aspects, features, and advantages of the present disclosure will be more clearly understood from the following detailed description, taken in conjunction with the accompanying drawings, in which.

MODE FOR INVENTION

Figure 1:
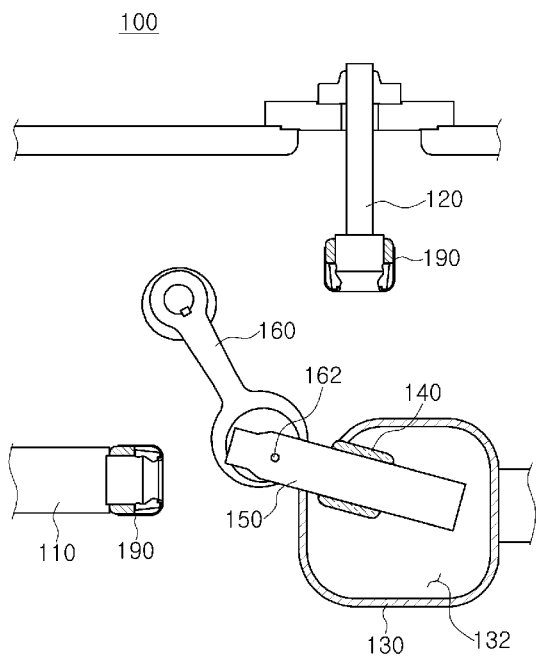
FIG. 1 is a side cross-sectional view of a disconnecting switch and an earthing switch according to an embodiment.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no other elements or layers intervening therebetween. Like numerals refer to like elements throughout. As used herein, the term "and/or" includes any and all combinations of one or more of the associated listed items.

It will be apparent that although the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship relative to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" relative to other elements would then be oriented "below," or "lower" relative to the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape resulting from manufacturing. The following embodiments may also be constituted alone or as a combination thereof.

The contents of the present disclosure described below may have a variety of configurations and only a required configuration is proposed herein, but the present disclosure is not limited thereto.

Figure 2:
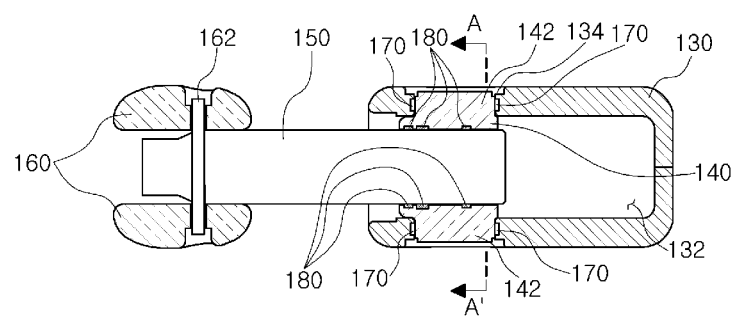
FIG. 2 is a plan cross-sectional view of an assembly having a mover unit fixed conductor, a rotatable conductor, and a mover attached to one another and included in the disconnecting switch and the earthing switch illustrated in FIG. 1.
Figure 3:
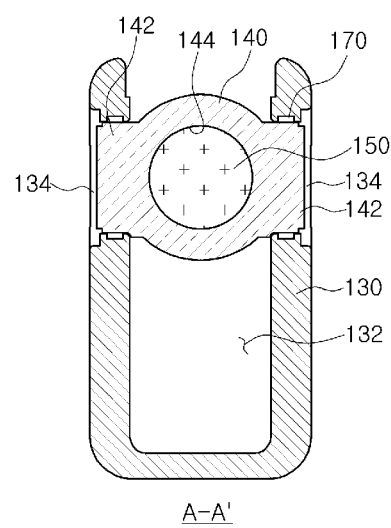
FIG. 3 is a cross-sectional view taken along line A-A' of the assembly illustrated in FIG. 2.

Referring to FIGS. 1 through 3, disconnecting and earthing switches according to an embodiment will be described.

As illustrated in FIGS. 1 through 3, disconnecting and earthing switches 100 according to an embodiment may include a first fixed conductor 110, a second fixed conductor 120, a mover unit fixed conductor 130, a rotatable conductor 140, a mover 150, and an operation lever 160, and may further include a first contact member 170, a second contact member 180, and a contact 190.

The first fixed conductor 110 may be fixed to the inside of an enclosure (not illustrated) of a gas-insulated switchgear in which the disconnecting and earthing switches 100 are installed.

In an embodiment, the first fixed conductor 110 may be a conductor having a bar shape, protruding inwardly into the enclosure.

The first fixed conductor 110 may be connected to a transmission line to form the disconnecting switch together with the mover 150, the rotatable conductor 140, and the mover unit fixed conductor 130 to be described below.

The second fixed conductor 120 may be fixed to the inside of the enclosure, and may be disposed to be spaced apart from the first fixed conductor 110.

In an embodiment, the second fixed conductor 120 may be a conductor having a bar shape, protruding inwardly into the enclosure.

The second fixed conductor 120 may be connected to a grounding member (not illustrated) such as a grounding bonding conductor (a conductor connected to the enclosure of the gas-insulated switchgear) and a grounding bushing to form the earthing switch together with the mover 150, the rotatable conductor 140, and the mover unit fixed conductor 130 to be described below.

Meanwhile, in an embodiment, as illustrated in FIG. 1, the first fixed conductor 110 may be disposed on a front or rear end of the enclosure, and the second fixed conductor 120 may be disposed on an upper or lower end of the enclosure so as to be disposed in a direction perpendicular to an extension line of the first fixed conductor 110 in a lengthwise direction thereof, but is not limited thereto.

The mover unit fixed conductor 130 as a conductor fixed to the inside of the enclosure may be disposed to face the second fixed conductor 120 while facing the first fixed conductor 110.

The mover unit fixed conductor 130 may be connected to a transmission line different from that connected to the first fixed conductor 110 to form a conducting path electrically connecting the transmission line connected to the first fixed conductor 110 to that connected to the mover unit fixed conductor 130 when the mover unit fixed conductor 130 is electrically connected to the first fixed conductor 110.

In an embodiment, the mover unit fixed conductor 130 may have an internal space 132 in which a portion of the rear of the mover 150 protruding from the rotatable conductor 140 to be described later may be received, as illustrated in FIGS. 1 through 3.

The mover unit fixed conductor 130 may also have a rotary groove 134 to which a rotary shaft portion 142 of the rotatable conductor 140 to be described layer may be rotatably coupled.

In an embodiment, the mover unit fixed conductor 130 may also be disposed such that the center of the rotary groove 134 may be positioned in a location at which the extension line of the first fixed conductor 110 and the extension line of the second fixed conductor 120 intersect at right angles.

The rotatable conductor 140 may be provided in the mover unit fixed conductor 130, and may be a conductor which may be rotated in directions of the first fixed conductor 110 and the second fixed conductor 120 in a state in which the rotatable conductor 140 is electrically connected to the mover unit fixed conductor 130.

In an embodiment, the rotatable conductor 140 may have the rotary shaft portion 142 coupled to the rotary groove 134 of the mover unit fixed conductor 130.

Here, the rotary shaft portion 142 of the rotatable conductor 140 may be coupled to the rotary groove 134, so that the rotatable conductor 140 may be rotated in a vertical direction of the enclosure.

The rotary shaft portion 142 of the rotatable conductor 140 may also be coupled to the rotary groove 134, so that, as illustrated in FIG. 1, the rotatable conductor 140 may be positioned in the location at which the extension line of the first fixed conductor 110 and the extension line of the second fixed conductor 120 intersect at right angles.

In an embodiment, the rotatable conductor 140 may have a hollow portion 144 into which the mover 150 to be described below may be inserted.

The mover 150 may be coupled to the rotatable conductor 140, as illustrated in FIGS. 1 through 3, and may be a conductor which may be slid in a lengthwise direction of the mover 150 in a state in which the mover 150 is electrically connected to the rotatable conductor 140.

The mover 150 may be electrically connected to the mover unit fixed conductor 130 by the rotatable conductor 140.

In an embodiment, the mover 150 may be inserted into and coupled to the hollow portion 144 of the rotatable conductor 140, and may include a conductor having a bar shape, moving forwardly and backwardly in the hollow portion 144 while sliding therein.

The mover 150 may be electrically and constantly connected to the rotatable conductor 140. When a front end portion of the mover 150 is connected to the first fixed conductor 110, a conducting path may be formed to electrically connect the first fixed conductor 110 to the mover unit fixed conductor 130. When the front end portion of the mover 150 is connected to the second fixed conductor 120, a conducting path may be formed to electrically connect the second fixed conductor 120 to the mover unit fixed conductor 130.

The operation lever 160 may have one end rotatably coupled to a device body (the enclosure), and the other end rotatably connected to the mover 150, and may selectively connect the mover 150 to the first fixed conductor 110 or the second fixed conductor 120 while rotating.

In order to perform such an operation, in an embodiment, the operation lever 160 may be disposed in a location at which the operation lever 160 may and the rotatable conductor 140 may be equidistant to a line connecting a front end portion of the first fixed conductor 110 to that of the second fixed conductor 120, as illustrated in FIG. 1.

Here, the operation lever 160 may be configured to allow the first fixed conductor 110 and the second fixed conductor 120 to be positioned on a rotational radius of the other end of the operation lever 160 when a body of the operation lever 160 is rotated, based on one end of the operation lever 160.

In an embodiment, the other end of the operation lever 160 may be coupled to lateral surfaces of the front end portion of the mover 150 by a rotary pin 162 to be rotated in a vertical direction of the mover 150.

A rotary shaft disposed on the other end of the operation lever 160 may be connected to an operator (not illustrated) provided outside of the enclosure to be rotated.

The first contact member 170 may be provided on a contact portion between the rotatable conductor 140 and the mover unit fixed conductor 130, and may support the rotatable conductor 140 to allow the rotatable conductor 140 to be rotated on the mover unit fixed conductor 130, while electrically connecting the rotatable conductor 140 to the mover unit fixed conductor 130, as illustrated in FIGS. 2 and 3.

That is, the first contact member 170, as a type of movable contact, may allow an electrical contact between the rotatable conductor 140 and the mover unit fixed conductor 130, between which a contact portion is movable, to be stably maintained.

The second contact member 180 may be provided on a contact portion between the mover 150 and the rotatable conductor 140, and may support the mover 150 to allow the mover 150 to be slid on the rotatable conductor 140, while electrically connecting the mover 150 to the rotatable conductor 140, as illustrated in FIGS. 2 and 3.

That is, the second contact member 180, as a type of movable contact, may allow an electrical contact between the mover 150 and the rotatable conductor 140, between which a contact portion is movable, to be stably maintained.

The contact 190, as a contact having a groove in which the front end portion of the mover 150 may be received, may be configured to allow the front end portion of the mover 150 to be inserted into and connected to the contact 190.

In an embodiment, the contact 190 may be provided on each of the first fixed conductor 110 and the second fixed conductor 120.

The contact 190 may strongly contact the mover 150 connected to the first fixed conductor 110 or the second fixed conductor 120 to ensure a stable electrical contact between the first fixed conductor 110 or the second fixed conductor 120, and the mover 150.

As an example, the contact 190 may be configured to have various contact types, such as a tulip contact type, in which a plurality of connecting tips are configured to bite an outer peripheral surface of the mover 150, or a spring contact type, in which a plurality of connecting tips surround and pressurize the outer peripheral surface of the mover 150.

Hereinafter, referring to FIGS. 1, 4, and 5, a three-position operation of the disconnecting and earthing switches 100 according to an embodiment will be described.

First, returning to FIG. 1, in open states of the disconnecting and earthing switches 100, the other end of the operation lever 160 may be disposed on the side of the mover unit fixed conductor 130, so that the mover 150 may be separated from all of the first fixed conductor 110 and the second fixed conductor 120.

Here, since the other end of the operation lever 160 may be disposed adjacent to the side of the mover unit fixed conductor 130, the mover 150 may be allowed to move backward from the rotatable conductor 140. At this time, a portion of the rear of the mover 150 protruding to a rear end of the rotatable conductor 140 by moving backwardly from the rotatable conductor 140, may be received in the internal space 132 of the mover unit fixed conductor 130, as mentioned above.

Figure 4:
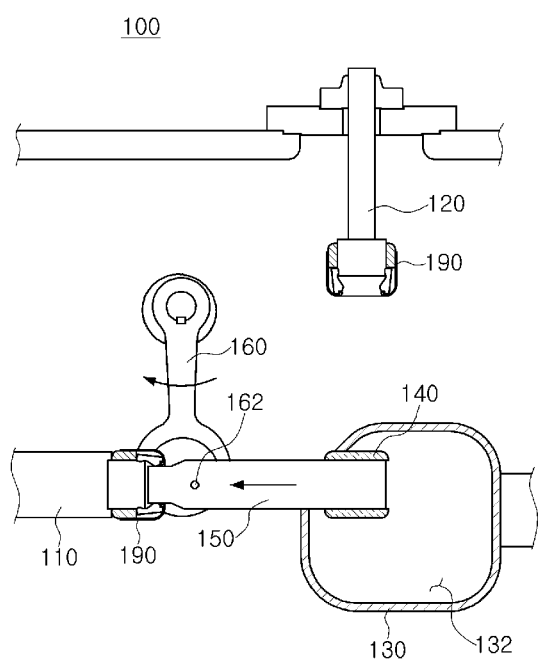
FIG. 4 is a side cross-sectional view of the disconnecting switch and the earthing switch illustrated in FIG. 1 in a closed state of the disconnecting switch.

Referring to FIG. 4, in a state in which the disconnecting switch is closed, the operation lever 160 may be rotated in a direction of the first fixed conductor 110 to connect the front end portion of the mover 150 to the contact 190 provided in the first fixed conductor 110.

Here, the rotatable conductor 140 may be disposed such that the front end portion thereof may face the first fixed conductor 110 by the rotation of the operation lever 160. Thereafter, the mover 150 may move forward from the rotatable conductor 140 by the rotation of the operation lever 160 to be connected to the first fixed conductor 110.

Figure 5:
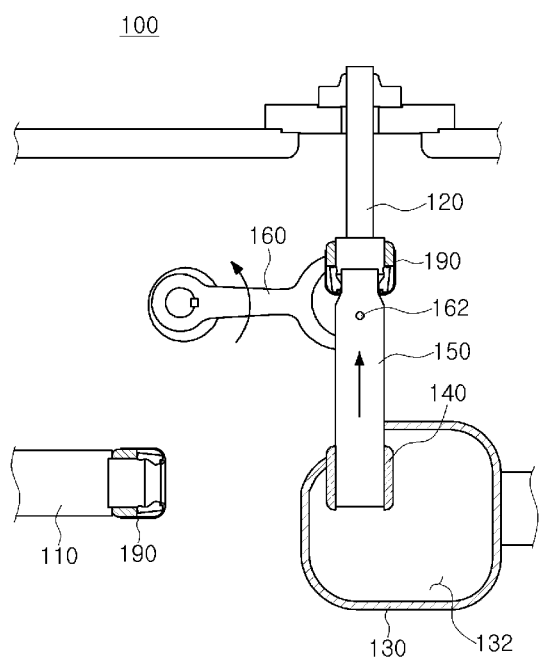
FIG. 5 is a side cross-sectional view of the disconnecting switch and the earthing switch illustrated in FIG. 1 in a closed state of the earthing switch.
Figure 6:
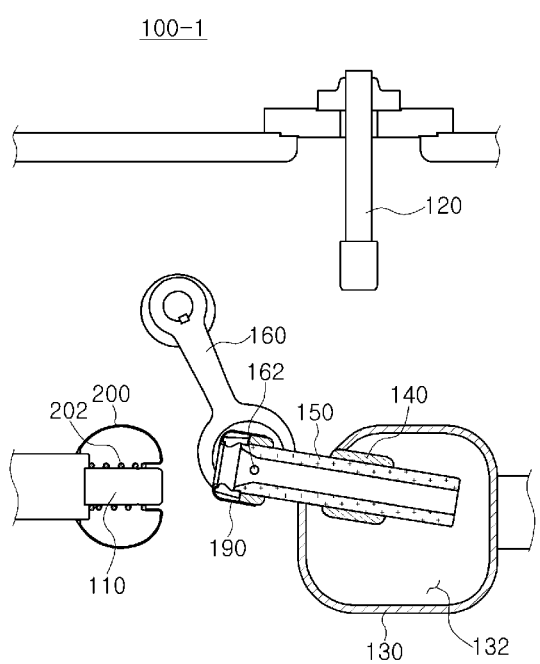
FIG. 6 is a side cross-sectional view of a disconnecting switch and an earthing switch according to another embodiment.
Figure 7:
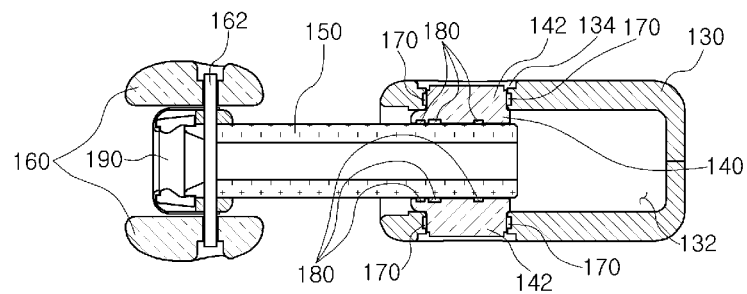
FIG. 7 is a plan cross-sectional view of an assembly having a mover unit fixed conductor, a rotatable conductor, and a mover attached to one another and included in the disconnecting switch and the earthing switch illustrated in FIG. 6.
Figure 8:
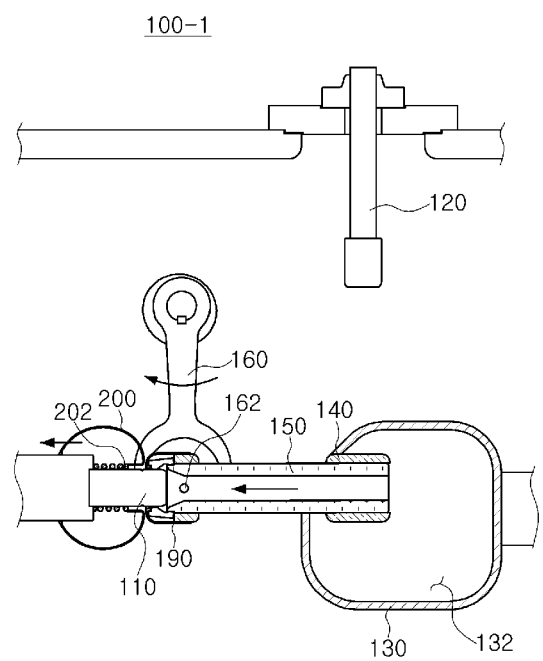
FIG. 8 is a side cross-sectional view of the disconnecting switch and the earthing switch illustrated in FIG. 6 in a closed state of the disconnecting switch.
Figure 9:
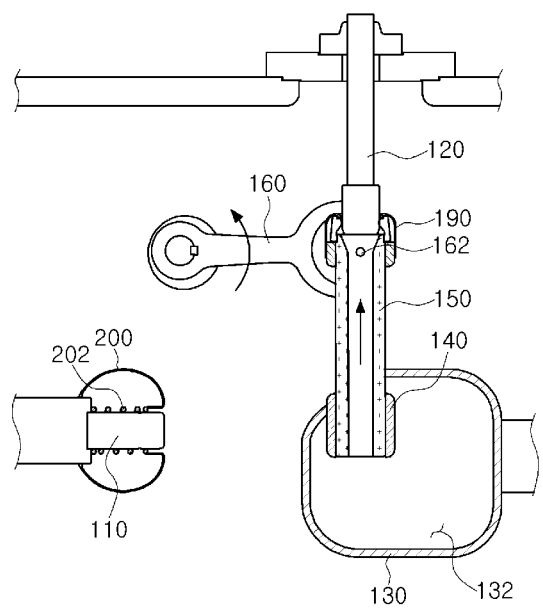
FIG. 9 is a side cross-sectional view of the disconnecting switch and the earthing switch illustrated in FIG. 6 in a closed state of the earthing switch.

Referring to FIG. 5, in a state in which the disconnecting switch is closed, the operation lever 160 may be rotated in a direction of the second fixed conductor 120 to connect the front end portion of the mover 150 to the contact 190 provided in the second fixed conductor 120.

Here, the rotatable conductor 140 may be disposed such that the front end portion thereof may face the second fixed conductor 120 by the rotation of the operation lever 160. Thereafter, the mover 150 may move forward from the rotatable conductor 140 by the rotation of the operation lever 160 to be connected to the second fixed conductor 120.

As forementioned, the disconnecting and earthing switches 100 according to an embodiment may have the advantage of implementing three positions with a single operation lever 160, thereby reducing the size of the gas-insulated switchgear.

In addition, the disconnecting and earthing switches 100 according to an embodiment may have the advantage of allowing the rotatable conductor 140 and the mover 150 to be connected to the first fixed conductor 110 or the second fixed conductor 120, the rotatable conductor 140 being rotated, the mover 150 being moved linearly on the rotatable conductor 140, and of having a structure in which the first fixed conductor 110 or the second fixed conductor 120, and the mover 150 may be connected to each other in a conductor insert manner, other than a simple surface contact manner, thereby ensuring a stable interconductor contact.

Unlike disconnecting and earthing switches of a lever type according to the related art allowing the mover 150 to be only rotated between both fixed conductors, the disconnecting and earthing switches 100 according to an embodiment may also have the advantage of allowing the mover 150 to be simultaneously rotated and retreated upon operation, so that the mover 150 may be spaced far apart from the first fixed conductor 110 and the second fixed conductor 120 in a state in which the disconnecting and earthing switches 100 are open, thereby ensuring a long insulating distance, and reducing the size of the gas-insulated switchgear while ensuring a sufficient insulating distance.

Referring next to FIGS. 6 through 11, a disconnecting and earthing switches 100-1 according to another embodiment will be described.

The disconnecting and earthing switches 100-1 according to another embodiment, illustrated in FIGS. 6 through 11, may differ in that an installation position of a contact 190 may be changed and in that an additional shield 200 may be provided, as compared with the disconnecting and earthing switches 100 according to an embodiment illustrated in FIGS. 1 through 5.

Above this, a configuration and an operating principle of a first fixed conductor 110, a second fixed conductor 120, a mover unit fixed conductor 130, a rotatable conductor 140, and a mover 150 may be substantially the same as those described in the disconnecting and earthing switches 100 according to an embodiment illustrated in FIGS. 1 through 5, and a description thereof may be omitted.

Thus, the contact 190 and the shield 200, included in the disconnecting and earthing switches 100-1 according to another embodiment, will be hereinafter described.

First, as illustrated in FIGS. 6 through 9, in another embodiment, the contact 190 may be provided on a front end portion of the mover 150, and may be excluded from the first fixed conductor 110 and the second fixed conductor 120.

Here, the contact 190 may be configured such that front end portions of the first fixed conductor 110 or the second fixed conductor 120 may be inserted into and connected to the contact 190.

As such, in another embodiment in which the contact 190 may be provided on the mover 150, the number of contacts 190 may be reduced, as compared with that of an embodiment in which the contact 190 may be provided in each of the first fixed conductor 110 and the second fixed conductor 120, and production costs of a gas-insulated switchgear may thus be lowered.

Meanwhile, referring to FIGS. 10 and 11, the shield 200 will be described.

The shield 200 may be a conductor provided to surround an outer peripheral surface of the front end portion of the first fixed conductor 110. The shield 200 may be configured to have a shape in which the overall appearance thereof may be rounded and an internal space is formed therein, so as to alleviate an electrical field generated in the front end portion of the first fixed conductor 110.

Figure 10:
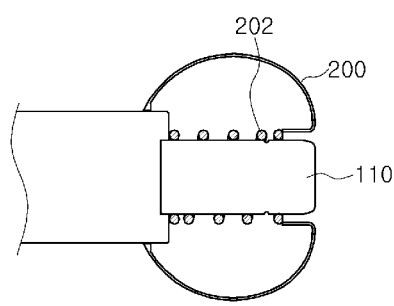
FIG. 10 is a side cross-sectional view of a shield included in the disconnecting switch of the disconnecting switch and the earthing switch illustrated in FIG. 6.
Figure 11:
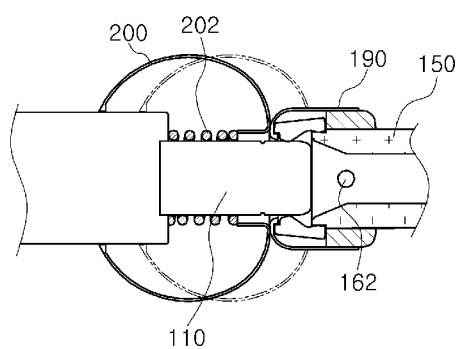
FIG. 11 is a side cross-sectional view of the shield in a state in which the disconnecting switch is closed.

In an embodiment, the shield 200 may be configured to have the inner diameter of a front end portion thereof, greater than the outer diameter of the front end portion of the first fixed conductor 110 and less than the outer diameter of the contact 190, as illustrated in FIGS. 10 and 11.

Preferably, the shield 200 may be configured such that a portion of the inner diameter thereof may contact or closely contact the outer peripheral surface of the first fixed conductor 110.

This may cause a spacing between the shield 200 and the first fixed conductor 110 to be nearly removed, so that the first fixed conductor 110 may be formed to have a shape in which the front end portion thereof may be entirely rounded or planarized without having a sharp edge portion on which an electrical field may be concentrated, thereby significantly alleviating an electrical field generated in the front end portion of the first fixed conductor 110.

Meanwhile, in such a structure, in a state in which the disconnecting switch is closed, the contact 190 and the shield 200 may interfere with each other when the front end portion of the first fixed conductor 110 is inserted into the contact 190 provided on the mover 150.

Thus, in another embodiment, the shield 200 may be configured to move backward to the rear of the first fixed conductor 110 by external force, and to return to the original position when the external force is removed, as illustrated in FIG. 11.

To this end, in another embodiment, the shield 200 may be supported by the first fixed conductor 110 by an elastic member 202. As an example, the elastic member 202 may be a compression spring having one end supported by the first fixed conductor 110 and the other end fixed to the shield 200, but is not limited thereto.

In such a configuration, in a state in which the disconnecting switch is closed, when the mover 150 is connected to the first fixed conductor 110, the contact 190 may allow the shield 200 to be moved backward, and thus the elastic member 202 may be compressed.

Thereafter, in a state in which the disconnecting switch is open, when the mover 150 is separated from the first fixed conductor 110, the elastic member 202 may allow the shield 200 to move forward, and thus the shield 200 may be disposed on the front end portion of the first fixed conductor 110.

While exemplary embodiments have been shown and described above, it will be apparent to those skilled in the art that modifications and variations could be made without departing from the scope of the present invention as defined by the appended claims.

The invention claimed is:

1. A disconnecting switch and an earthing switch for a gas-insulated switchgear comprising:
   a first fixed conductor;
   a second fixed conductor disposed to be spaced apart from the first fixed conductor;
   a mover unit fixed conductor disposed to face the first fixed conductor and the second fixed conductor;
   a rotatable conductor provided in the mover unit fixed conductor, and rotatable in directions of the first fixed conductor and the second fixed conductor in a state in which the rotatable conductor is electrically connected to the mover unit fixed conductor;
   a mover coupled to the rotatable conductor, and slidable in a lengthwise direction in a state in which the mover is electrically connected to the rotatable conductor; and
   an operation lever having one end rotatably coupled to a device body and the other end rotatably connected to the mover, and rotating to selectively connect the mover to the first fixed conductor or the second fixed conductor.

2. The disconnecting switch and an earthing switch of claim 1, wherein the rotatable conductor is provided in a location at which an extension line of the first fixed conductor and an extension line of the second fixed conductor intersect at right angles.

3. The disconnecting switch and an earthing switch of claim 1, wherein the rotatable conductor and the mover unit fixed conductor have a first contact member provided on a contact portion between the rotatable conductor and the mover unit fixed conductor, the first contact member supporting the rotatable conductor to allow the rotatable conductor to be rotated on the mover unit fixed conductor, and electrically connecting the rotatable conductor to the mover unit fixed conductor.

4. The disconnecting switch and an earthing switch of claim 1, wherein the mover and the rotatable conductor have a second contact member provided on a contact portion between the mover and the rotatable conductor, the second contact member supporting the mover to allow the mover to be slid on the rotatable conductor, and electrically connecting the mover to the rotatable conductor.

5. The disconnecting switch and an earthing switch of claim 1, further comprising: contacts configured to allow a front end portion of the mover to be inserted into and connected to the contacts,
   wherein the contacts are provided in the first fixed conductor and the second fixed conductor, respectively.

6. The disconnecting switch and an earthing switch of claim 1, further comprising: a contact configured to allow front end portions of the first fixed conductor and the second fixed conductor to be inserted into and connected to the contact, wherein the contact is provided in the mover.

7. The disconnecting switch and an earthing switch of claim 6, further comprising: a shield provided to surround an outer peripheral surface of the front end portion of the first fixed conductor to alleviate an electrical field generated in the first fixed conductor.

8. The disconnecting switch and an earthing switch of claim 7, wherein the shield is configured to have an inner diameter of a front end portion thereof wider than an outer diameter of the front end portion of the first fixed conductor and narrower than an outer diameter of the contact.

9. The disconnecting switch and an earthing switch of claim 8, wherein the shield moves backward to a rear of the first fixed conductor by external force, and is supported by the first fixed conductor by the medium of an elastic member in order to return to the original position when the external force is removed.

10. The disconnecting switch and an earthing switch of claim 1, wherein the mover unit fixed conductor has an internal space that receives a portion of the mover protruding from the rotatable conductor.

11. The disconnecting switch and an earthing switch of claim 1, wherein the first fixed conductor is connected to a transmission line, and the second fixed conductor is connected to a grounding member.

* * * * *